United States Patent [19]

Mimura et al.

[11] Patent Number: 5,257,280
[45] Date of Patent: Oct. 26, 1993

[54] GAS INTRODUCING AND STIRRING APPARATUS OF METALLURGICAL VESSEL

[75] Inventors: Nobuyuki Mimura, Pittsburgh, Pa.; Minoru Ususaka, Ako, Japan

[73] Assignee: Kawasaki Refractories Co., Ltd., Hyogo, Japan

[21] Appl. No.: 756,791

[22] Filed: Sep. 10, 1991

[30] Foreign Application Priority Data

Apr. 12, 1991 [JP] Japan .................................. 3-108677

[51] Int. Cl.⁵ .............................................. F27D 23/04
[52] U.S. Cl. ........................................ 373/85; 373/86; 373/71; 373/72; 266/266; 266/270; 110/173 R; 75/10.17
[58] Field of Search ................. 373/85, 86, 60, 71, 373/72, 77; 266/220, 217, 266, 270; 110/173 R, 173 C; 75/10 R, 49

[56] References Cited

U.S. PATENT DOCUMENTS

| | | | |
|---|---|---|---|
| 2,363,582 | 11/1944 | Gerber et al. | 373/85 |
| 3,752,895 | 8/1973 | Clishem et al. | 373/85 |
| 4,371,392 | 2/1983 | Hasegawa et al. | 373/85 |
| 4,726,033 | 2/1988 | Lazcano-Navarro et al. | 373/71 |
| 4,735,400 | 4/1988 | Tate et al. | 266/266 |
| 4,903,948 | 2/1990 | Wolf et al. | 266/220 |

FOREIGN PATENT DOCUMENTS 3742861 6/1987 Fed. Rep. of Germany .
2304584 8/1990 Japan .

*Primary Examiner*—Geoffrey S. Evans
*Assistant Examiner*—Tu Hoang
*Attorney, Agent, or Firm*—Birch, Stewart, Kolasch & Birch

[57] ABSTRACT

The present invention has been devised to obtain a metallurgical effect by introducing refining gas into a molten metal in a metallurgical vessel and stirring the molten metal sufficiently by convection, and to improve durability of one nozzle or a few nozzles for introducing the refining gas. At a predetermined position of a furnace bottom onto which a ramming mass is provided, a few cylindrical refractory sleeves are disposed close to the upper face of the furnace bottom from the lower portion thereof. In each cylindrical refractory sleeve a gas introducing nozzle, which introduces the refining gas, is disposed in such a manner that it can be drawn out downwardly for replacement. On the gas introducing nozzle, a gas pool formed by packing refractory granules from to 5 mm to 200 mm thick throughout the sleeve is disposed, and a ramming mass having a gas permeability equal to or larger than the ramming mass of the furnace bottom is installed in the sleeve up to its upper end, whereby the refining gas is introduced into the molten metal from the determined position to stir it by convection.

8 Claims, 4 Drawing Sheets

FIG. I

GAS INTRODUCING AND STIRRING APPARATUS OF METALLURGICAL VESSEL

BACKGROUND OF THE INVENTION

1. Field of the Invention

The present invention relates to a gas introducing and stirring apparatus for a metallurgical vessel such as an electric arc furnace or a basic oxygen furnace in a metallurgical field.

2. Description of Related Art

Recently, in a basic oxygen furnace and an electric arc furnace used in the steelmaking process, a few gas introducing nozzles of a refining gas are disposed on the furnace bottom, and through which oxygen, CO, $CO_2$, hydrocarbon or inert gas is introduced to forcibly stir a molten metal, thereby enhancing the refining efficiency. Particularly, it is widely used universally in the electric arc furnace, in which an electric arc is used to melt steel scraps as a main raw material.

As means for introducing the refining gas from the furnace bottom, the following two means may be given. One is as shown in FIG. 6 and the other is as shown in FIG. 7.

FIG. 6, developed by the applicant, introduces the refining gas directly into the molten metal through each gas introducing nozzle 1 which consists of MgO-C material and in which small diameter pipes of stainless steel are buried, as shown in FIG. 6. In this type of gas introducing means, though the molten metal is stirred by convection, as shown in the figure, to enhance the stirring effect, when the refining gas is blown, the gas introducing nozzle 1 and its peripheral refractories are exposed to wear and tear by the molten metal and slag which are stirred forcibly as the refining proceeds.

Accordingly, the life of the gas introducing nozzle 1 is generally 150 to 350 heating, so that at the end of its service life the electric arc furnace 2 must be cooled down to replace or repair the gas introducing nozzle 1 and its peripheral refractories. As a result, the electric arc furnace must be shut off for five hours or more at a minimum including the cooling time of the furnace body, and the production ability of the electric arc furnace must be suspended.

Meanwhile, the latter means for introducing refining gas from the furnace bottom is disclosed in German Patent No. DE-3742861 and representatively shown in FIG. 7. A gas introducing nozzle 3 is buried in the refractory bricks of the furnace bottom 5 of the electric arc furnace 4, and the refining gas is introduced through pores of a ramming mass 6 having a low gas permeability different from a conventional higher density ramming mass of the furnace bottom 5. In the latter case, since the gas introducing nozzle 3 is not in direct contact with the molten metal, a life expectancy of the nozzle is the same as that of the ramming mass 6 of the furnace bottom 5 having the low gas permeability. Thus the nozzle is durable for more than a half year (3,000 heats) if only the ramming mass 6 and its upper wear lining material 7 are subjected to a hot repair.

In the case aforementioned, however, the refining gas is dispersed by a deflector plate 8 and introduced into a large area through the irregular plate of the ramming mass having lower gas permeability and lined throughout the furnace hearth, so that the position through which the refining gas is introduced into the molten metal are unstable, and the molten metal may not be stirred by convection as shown in the figure since the refining gas is dispersed widely, thus the metallurgical effect obtained by introducing the refining gas for stirring the molten metal is considerably deteriorated.

Furthermore, in this process, since the ramming mass of low gas permeability is used throughout the furnace hearth, lead is likely to permeate and accumulate in the ramming mass during use. Therefore, during a long time use, the pores in the ramming mass are clogged to block the refining gas. Besides, when the pores are clogged, the ramming mass of low gas permeability used throughout the furnace hearth must be replaced, resulting in an economical problem.

Accordingly, we have conducted various research such as burying an apparatus or apparatuses for introducing and stirring gas into the furnace bottom and surrounding its periphery by metal materials in an electric are furnace (Japanese Patent Application No. Hei 2-304584 (1990).

SUMMARY OF THE INVENTION

The present invention has been devised in view of the aspects aforementioned. Therefore, in order to solve the above problems, it is an object of the present invention to provide a gas introducing and stirring apparatus for a metallurgical vessel, wherein a ramming mass is disposed on the furnace bottom of the metallurgical vessel, a cylindrical refractory sleeve is provided in the furnace bottom close to its upper end from the lower portion at a prescribed position through which refining gas is to be introduced, a gas introducing nozzle for introducing the refining gas therethrough is buried in the cylindrical refractory sleeve, and a gas pool provided with refractory granules or a spatial gas pool is disposed on the upper surface of the gas introducing nozzle, and further a ramming mass having the gas permeability equal to or larger than that of the furnace bottom is disposed substantially up to the upper end in the sleeve at the upper portion thereof.

In the present invention, by the gas introducing nozzle buried in the cylindrical sleeve on the furnace bottom of the metallurgical vessel where the ramming mass is disposed, the refining gas is introduced into the molten metal in the metallurgical vessel along the cylindrical sleeve without being dispersed such that the molten metal can be stirred by convection.

Further, by the gas pool of refractory granules or the spatial gas pool from a 5 mm to 200 mm thickness provided on the upper surface of the gas introducing nozzle, the refining gas can be introduced uniformly throughout the sleeve into the molten metal via the upper ramming mass having the gas permeability equal to or larger than that of the surrounding ramming mass, such that the molten metal is stirred by convection and the refining gas can be introduced to refine the molten metal for a long time similar to a life span of the ramming mass of the furnace bottom. In addition, as the gas introducing and stirring apparatus is buried in the bottom, the refining gas can be introduced for refining the molten metal at any time when it is required.

A shape of the gas introducing nozzle may be in a tapered form with a relatively reduced diameter which reduces in an upward direction so that it can be easily manufactured and simply inserted into or drawn out from the cylindrical sleeve, resulting in reducing the cost. The upper diameter of the gas introducing nozzle is preferably 40 to 90% of that of the cylindrical sleeve.

Also, by projecting a cylindrical portion under the external shell of the furnace bottom of the metallurgical vessel and disposing the lower portion of the gas introducing nozzle therein, the gas introducing nozzle can be disposed in the sleeve as low as possible, thus the furnace bottom portion can be used longer and more effectively. By removing a flange which is removably fixed on the cylindrical portion, the gas introducing nozzle can be drawn out in a downwardly direction for replacement, thus the gas introducing nozzle can be replaced simply and the refining gas can be blown uniformly.

Moreover, by installing a temperature sensor such as a sheathed thermocouple in the sleeve around the gas introducing nozzle to monitor its thermal conductive state, the metallurgical vessel can be operated safely.

The above and other advantages of the present invention will become more apparent from the following description.

DETAILED DESCRIPTION OF PREFERRED EMBODIMENTS

Figure 1:
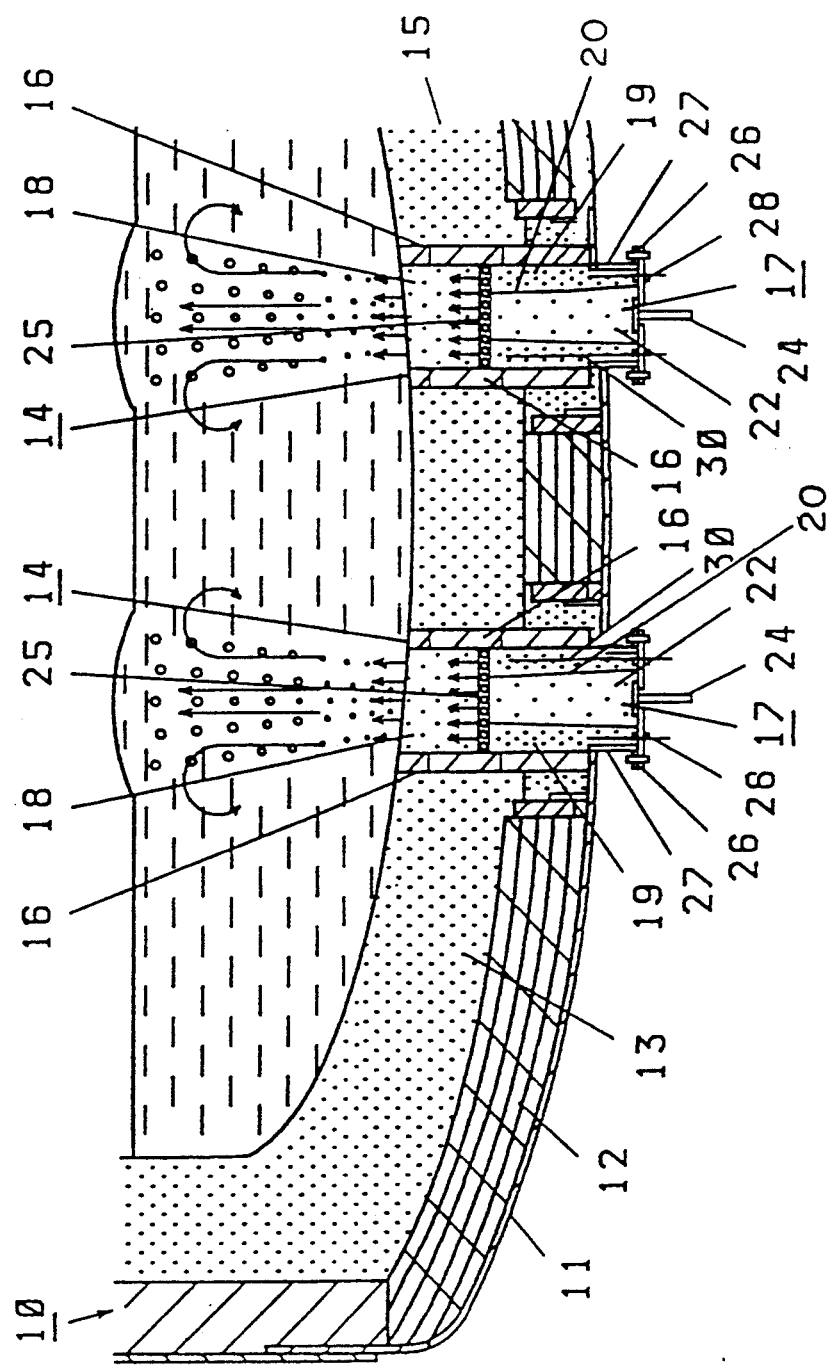
FIG. 1 is a partially schematic sectional side view of one embodiment of the present invention.
Figure 2:
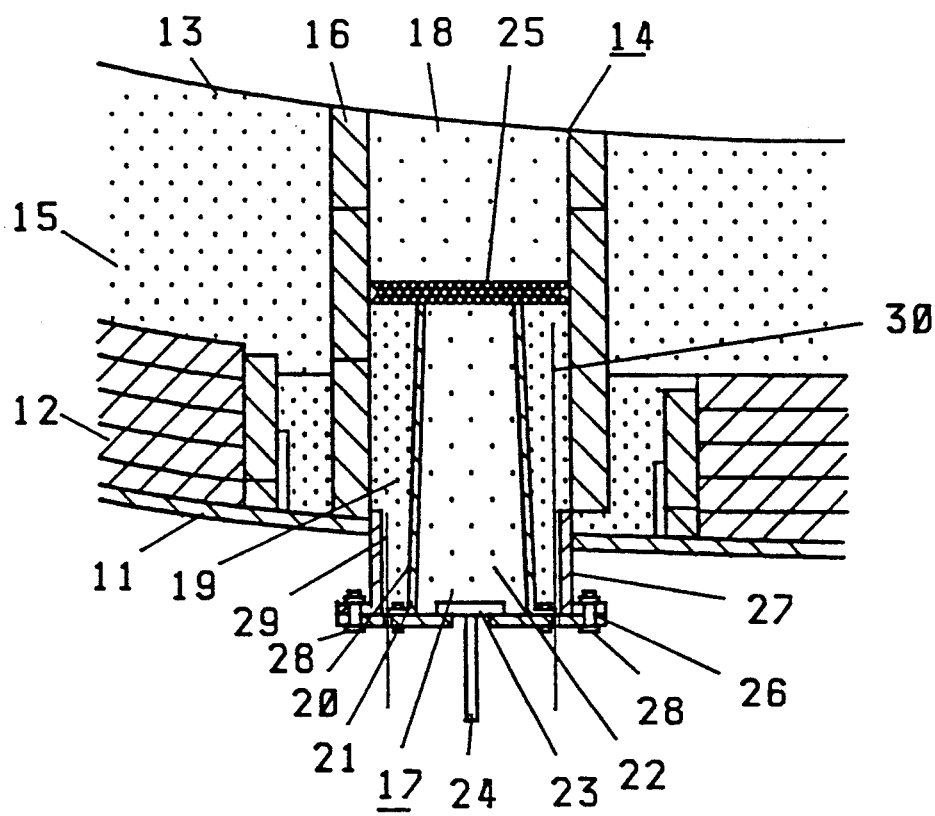
FIG. 2 is an expanded sectional side view of a gas introducing and stirring apparatus of the embodiment of the present invention.

In the following, the present invention will be described in connection with the preferred embodiments. FIGS. 1 to 5 show one embodiment of the present invention. In a metallurgical vessel 10 of an electric arc furnace, permanent bricks 12 are lined inside an outer furnace shell 11 of steel case, and a conventional higher density nature or low gas permeable ramming mass 13 is installed thereon as shown in FIG. 1. A few gas introducing and stirring apparatus 14 for stirring the molten metal are respectively buried in the ramming mass 13 at suitable intervals on the furnace bottom 15 of the metallurgical vessel 10, as shown in FIG. 1, so as to stir the molten metal by a refining gas. The gas introducing and stirring apparatus 14 may be formed from 100 mm to 1000 mm in diameter depending on the metallurgical vessel 10, and as shown in FIG. 1 and FIG. 2, a gas introducing nozzle 17 of a porous nozzle is buried in a cylindrical sleeve 16 made of refractory bricks, so as to introduce the refining gas uniformly into the molten metal via a ramming mass 18 disposed on the upper portion of the gas introducing nozzle 17 for stirring the molten metal by convection.

The sleeve 16 is formed in a unit or suitably laminated with dense refractory bricks or monolithic refractories from the bottom face to the upper face of the furnace bottom 15 as shown in FIG. 1 and FIG. 2, such that the refining gas blown in from the gas introducing nozzle 17 can be introduced into the molten metal without being dispersed all around. As the refractory bricks or monolithic refractories, refractory materials such as MgO, MgO-CaO, MgO-C etc. may be used. The sleeve 16 may be extended to a suitable distance from the upper surface of the furnace bottom 15.

Inside the substantially lower half portion of the sleeve 16, dense monolithic refractories 19 are filled, and in the center portion of which a truncated conical aperture 20 which reduces in diameter in an upward direction is formed and provided with the gas introducing nozzle 17 therein as shown in FIG. 1 and FIG. 2.

The gas introducing nozzle 17 is a porous nozzle formed such that its diameter is about 40 to 90% of the sleeve 16 so as to occupy about four-fifths to one sixth of the sectional area of the sleeve 16, and having a tapered cylindrical body to simplify the manufacture. Its outer surface is covered with a steel case 21 and the inner body is made of gas permeable refractories 22. On the bottom, there is provided a gas pool portion 23 to which a gas guide tube 24 is connected to introduce the refining gas therethrough. As the gas permeable refractories 22, refractory materials such as MgO, MgO-CaO, MgO-C, Al$_2$O$_3$ group are preferable. The gas permeable refractories 22 may also be made of a ramming mass having a sufficient gas permeability, or of burned or unburned bricks which are preformed and have a sufficient gas permeability. Refractories having a required gas permeability may be obtained simply by selecting the particle size structure of granules constituting the refractories.

On the upper surface of the gas introducing nozzle 17, as shown in FIG. 1 and FIG. 2, a layer of the refractory granules are provided throughout the sleeve 16 at a thickness of from 5 mm to 200 mm preferably about from 20 to 30 mm, to form a gas pool 25, whereon the ramming mass 18 having the same or preferably a higher gas permeability than those of the furnace bottom 15 is disposed up to the upper end of the sleeve 16 so as to introduce the refining gas uniformly into the molten metal as stated above. It is just sufficient for the granules to support the ramming mass 18 thereon and to form the gas pool 25 besides circulating the refining gas therethrough. As the material of the granules, a high quality refractories such as MgO and Al$_2$O$_3$ are preferable. It is also possible to form the granules with sublimate substances such as naphthalene so that they are dematerialized during use to form the gas pool 25, or to form the spatial gas pool 25 by installing a mesh box.

Figure 3:
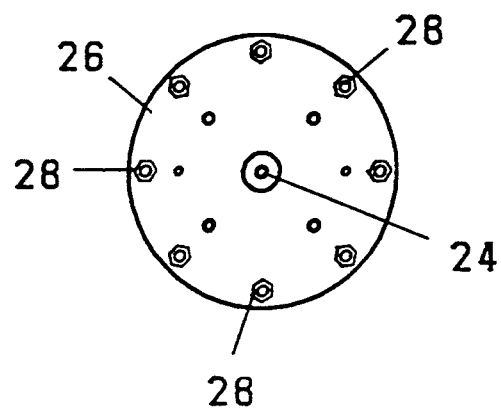
FIG. 3 is a bottom view thereof.

As stated above, as shown in FIG. 2 and FIG. 3, the gas introducing nozzle 17, which disperses the refining gas uniformly and introduces the same into the ramming mass 18 by the gas pool 25, has its bottom portion placed on a flange 26, which is removably fixed to a cylindrical portion 27 projected on the external shell 11 of the metallurgical vessel 10 by means of a clamping device 28 of bolts and nuts so as to be drawn out downwardly when necessary.

The gas introducing nozzle 17 is so formed that, by projecting downwardly under the furnace bottom 15 and buried therein as aforementioned, its upper surface is disposed at the position which is as low as possible in the furnace bottom 15, such that the furnace bottom 15 can be utilized effectively and the refining gas can be introduced uniformly. In addition, as shown in FIG. 2, temperature sensors 29, 30 such as a sheathed thermocouple are buried at upper and lower positions around the gas introducing nozzle 17 in the sleeve 16 so as to monitor the thermal conductive state longitudinally along the gas introduction nozzle 17.

EXAMPLE

In an electric arc furnace having a bottom thickness of 800 mm and a molten metal quantity of 70 tons, gas introducing and stirring apparatuses of the present invention were disposed in the center of electrodes to obtain the metallurgical effect as shown in the figure. For the gas introducing and stirring apparatus, burned bricks of 95% MgO were used as a surrounding refractory sleeve, the inside diameter, height and thickness of which were respectively 300 mm, 800 mm and 80 mm. An upper diameter of the gas introducing nozzle was selected at 50% of the sleeve diameter, and as gas permeable refractories for the gas introducing nozzle, a ramming mass of 94% MgO constituted by granules having a sufficient gas permeability was employed. As granular filling materials, MgO granules of a 2 to 4 mm diameter were used to form a gas pool of a 30 mm thickness. A ramming mass provided on the gas pool was selected to have the gas permeability higher than that of the surrounding ramming mass.

Figure 6:
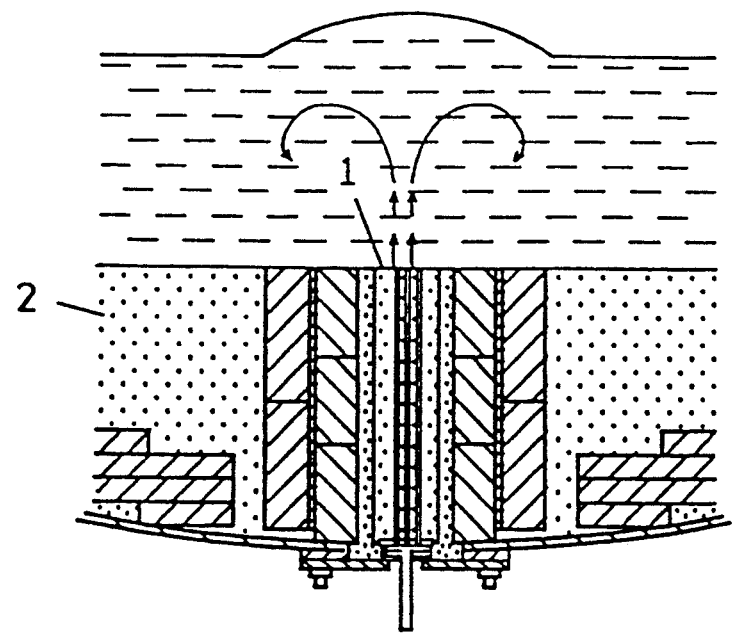
FIG. 6 is a sectional side view for explaining a conventional example developed by the applicant.
Figure 7:
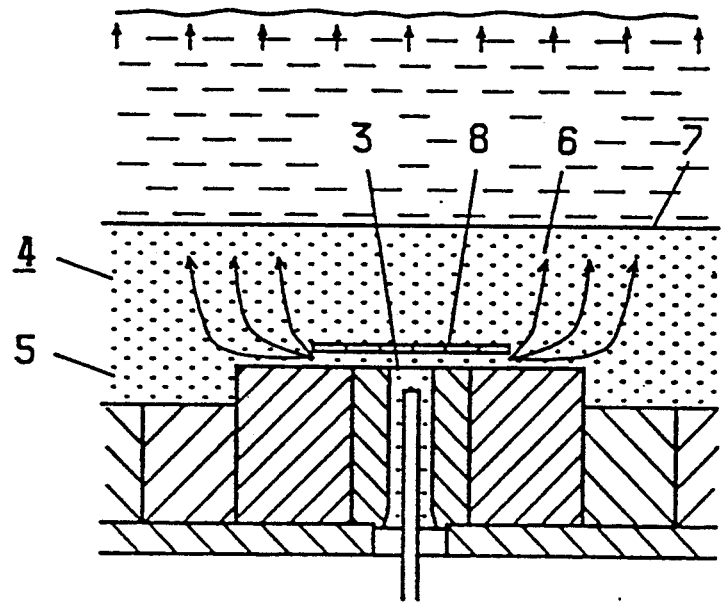
FIG. 7 is a sectional side view for explaining German Patent Application No. DE-3742861.

The results were compared between the case of no introduction of refining gas and a conventional type of FIG. 6 as shown in Table 1. The gas introducing and stirring apparatus of the present invention was successful in metallurgical effect by convection the same as the conventional type shown in FIG. 6. A wear condition of the ramming mass inside the sleeve of the gas introducing and stirring apparatus was equal to or below the ramming mass of the furnace hearth, and a service life of the nozzle was more than a year. It is because the quantity of gas per unit section area in the sleeve is small, and erosion caused by the turbulance abrasion of molten metal during the hot operation hardly occur. In any event, the ramming mass is cooled internally by the refining gas, which is filled uniformly in pores of the ramming mass during the operation to reduce wear.

Furthermore, in the conventional type, the refining gas must be introduced continuously in order to prevent clogging of the small gas introducing pipes, but such troubles are completely solved in the present invention, besides the refining gas can be suspended as required, resulting in reducing the gas consumption.

TABLE 1

| | Comparison Table | | |
|---|---|---|---|
| | no introducing gas | Conventional Type of FIG. 6 | Present invention of FIG. 1 |
| Nos. of Test (heats) | 400 | 300 | 350 |
| Mean Operation Time (min.) | 65 | 56 | 57 |
| Power Source Unit (kwh/t) | 371 | 360 | 362 |
| Yield Mn (%) | 83.9 | 88.1 | 87.8 |
| Yield Si (%) | 39.1 | 49.9 | 49.3 |
| Desulfurization Ratio (%) | 33 | 38 | 38 |
| Stirring Conditions | — | slags are moved aside and bare molten metal of about 600 mm diameter is confirmed | slags are moved aside and bare molten metal of about 700 mm diameter is confirmed |
| Unmolten Scrap remains | yes | no | no |
| Mean heat numbers before replacing nozzle | — | 261 | replacement not necessary for more then a year (presumption) |
| quantity of gas introduced (N1/min) | — | 65 | 75 |
| gas introduced | — | $N_2$ | $N_2$ |
| Nos. of nozzle | 0 | one in the center | three besides electrodes |

Figure 4:
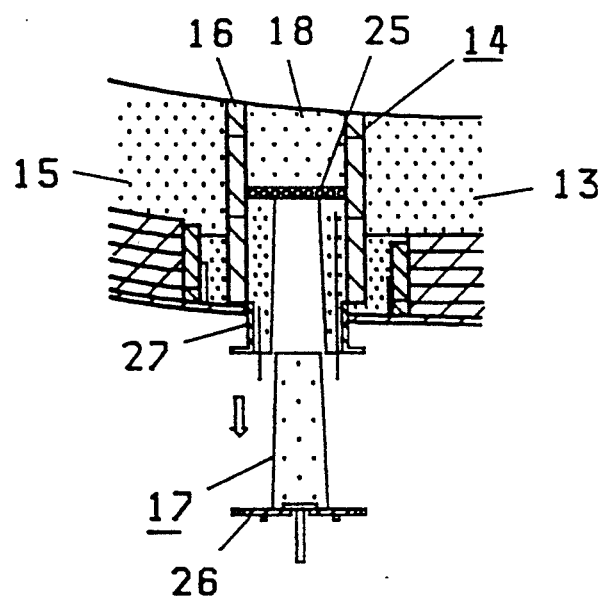
FIG. 4 is a sectional side view for explaining drawing out of a gas introducing nozzle thereof.
Figure 5:
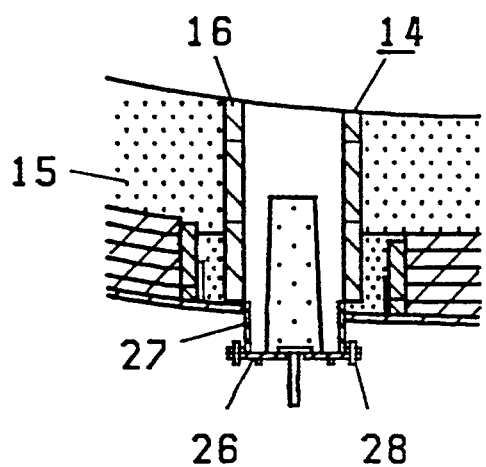
FIG. 5 is a sectional side view for explaining the replacement of a gas introducing and stirring apparatus thereof.

In the present invention, even when copper and lead permeate and accumulate in the ramming mass on the upper portion of the gas introducing and stirring apparatus during an extended period of operation, only a part of the gas introducing and stirring apparatus can be replaced simply and gas can be continuously introduced economically. That is, as shown in FIG. 4, when the flange of the cylindrical body projecting downwardly under the furnace bottom is removed and the gas introducing nozzle is drawn downwardly, it can be removed. Repair work can be done relatively easily by removing the dense refractories, the upper granules and the ramming mass in the sleeve, reinstalling the gas introducing nozzle, filling the refractories, and granules ramming mass are carried out as shown in FIG. 5, such that the same metallurgical effect can be maintained after replacement of the nozzle.

In the aforesaid embodiment, by changing the inside diameter of the refractory sleeve of the gas introducing and stirring apparatus, ascending areas (areas of bare molten metal) of the gas bubbles can be freely controlled. The shape of the gas introducing and stirring apparatus is not limited to the circular shape, it may be formed into a polygonal shape such as quadrangle or hexagon, when necessary. As the gas introducing nozzle, besides the porous nozzle, other types may also be used within the scope of the present invention. The gas introducing and stirring apparatus may be installed on the furnace bottom in a unit or in appropriate units depending upon the furnace capacity and quantity of gas to be introduced. When necessary, the refining gas may be introduced by replacing a predetermined number of units.

As described heretofore, in the present invention, the gas introducing and stirring apparatus can be buried in the furnace and can be used as long as the service life of the ramming mass of the furnace hearth, improving furnace productivity. Irrespective of the gas introducing and stirring apparatus buried in the ramming mass of the furnace hearth, the refining gas can be introduced into the molten metal through the sleeve without being dispersed to stir the molten metal by convection, thus a required refining effect is obtained. Further, since the refining gas can be suspended whenever necessary, gas consumption is reduced and such effects as aforementioned are obtained.

Having described the invention as related to a metallurgical vessel of an electric arc furnace, the present invention may be applied to a basic oxygen furnace and other refining furnaces. While the invention has been described in its preferred embodiments, it is to be understood that changes and variations may be made without

We claim:

1. A gas introducing and stirring apparatus for a metallurgical vessel, wherein a lining on a furnace bottom of the metallurgical vessel comprises:
   a gas permeable ramming mass;
   a cylindrical refractory sleeve provided in said gas permeable ramming mass and extended through an upper surface of the furnace bottom;
   a gas introducing nozzle of porous material for introducing a refining gas therethrough buried in the cylindrical refractory sleeve to about one half a height of the sleeve;
   a gas pool disposed within said sleeve and on an upper surface of said gas introducing nozzle; and
   a ramming mass having a gas permeability at least greater than the gas permeable ramming mass of the furnace bottom filled within said sleeve and above said gas pool, said ramming mass disposed substantially up to an upper end of said sleeve.

2. The gas introducing and stirring apparatus in accordance with claim 1, wherein a temperature sensor as a sheathed thermocouple is buried in the sleeve around the gas introducing nozzle.

3. The gas introducing and stirring apparatus in accordance with claim 1 or 2, wherein
   said cylindrical refractory sleeve is disposed from a lower end of the furnace bottom to an upper surface thereof, and the inside diameter of the sleeve is from 100 mm to 1000 mm.

4. The gas introducing and stirring apparatus in accordance with claim 1 or 2, wherein a gas introducing nozzle is a trapezoidal conical porous body, a cross-section of which reduces in an upward direction.

5. The gas introducing and stirring apparatus in accordance with claim 1 or 2, wherein an upper diameter of the gas introducing nozzle is 40 to 90% of that of the sleeve.

6. The gas introducing and stirring apparatus in accordance with claim 1 or claim 2, wherein said gas pool is formed by disposing refractory granules throughout the sleeve at a thickness of from 5 mm to 200 mm.

7. The gas introducing and stirring apparatus in accordance with claim 1 or claim 2, wherein said gas pool is formed by filling sublimate substances as naphthalene, which dematerialize into a spatial state.

8. The gas introducing and stirring apparatus in accordance with claim 1 or claim 2, wherein a cylindrical portion having a predetermined length is projected downward under an outer furnace bottom of the metallurgical vessel, and a lower portion of the gas introducing nozzle is disposed in said cylindrical portion, a flange is removably provided on a lower face of said cylindrical portion thereby the gas introducing nozzle is drawn out and replaced.

* * * * *